US012601091B2

(12) United States Patent
Kim et al.

(10) Patent No.: US 12,601,091 B2
(45) Date of Patent: *Apr. 14, 2026

(54) LEATHER FIBER FOR SPUN YARN

(71) Applicant: ATKO PLANNING INC., Paju-si (KR)

(72) Inventors: Ji Eon Kim, Seoul (KR); Bong Jin Choi, Gwangju-si (KR)

(73) Assignee: ATKO PLANNING INC., Paju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,425

(22) Filed: May 24, 2024

(65) Prior Publication Data

US 2024/0309563 A1 Sep. 19, 2024

Related U.S. Application Data

(62) Division of application No. 17/279,144, filed as application No. PCT/KR2021/000084 on Jan. 5, 2021, now Pat. No. 11,993,869.

(30) Foreign Application Priority Data

Jan. 13, 2020 (KR) ........................ 10-2020-0004118
Dec. 30, 2020 (KR) ........................ 10-2020-0187508

(51) Int. Cl.
*D02G 3/10* (2006.01)
*C14B 7/00* (2006.01)

(52) U.S. Cl.
CPC ................. *D02G 3/10* (2013.01); *C14B 7/00* (2013.01); *D10B 2211/06* (2013.01)

(58) Field of Classification Search
CPC .............................. D02G 3/10; D10B 2211/06
See application file for complete search history.

(56) References Cited

U.S. PATENT DOCUMENTS

2003/0207638 A1 11/2003 Bowlin et al.
2007/0186352 A1 8/2007 Zhang
(Continued)

FOREIGN PATENT DOCUMENTS

CN 2701881 Y 5/2005
CN 102212914 10/2011
(Continued)

OTHER PUBLICATIONS

BigDuckCanvasBlog, Measuring Textiles: What is Denier?, Mar. 9, 2015 (https://bigduckcanvasblog.com/2015/03/09/measuring-textiles-what-is-denier/). (Year: 2015).*
(Continued)

*Primary Examiner* — Patrick J. Lynch
(74) *Attorney, Agent, or Firm* — Sughrue Mion, PLLC

(57) ABSTRACT

Provided is leather fibers for use in yarn. The leather fibers forming the yarn are obtained from cowhide and a thickness index (M) of the leather fibers satisfies Equation 1:

$$M=D1/D2\leq 60 \quad \text{[Equation 1]}$$

where D1: average thickness of the 10 fibers having the highest thickness in 1 mg of leather fibers, and D2: average thickness of the 10 fibers having the lowest thickness in 1 mg of leather fibers.

1 Claim, 1 Drawing Sheet

(56) References Cited

U.S. PATENT DOCUMENTS

| | | | | |
|---|---|---|---|---|
| 2008/0072628 | A1* | 3/2008 | Liu | D02G 3/10 28/100 |
| 2009/0287308 | A1* | 11/2009 | Davis | A61L 17/08 623/13.12 |
| 2021/0123163 | A1 | 4/2021 | Hu et al. | |
| 2021/0164136 | A1* | 6/2021 | Hsiao | D04B 1/16 |
| 2021/0300994 | A1 | 9/2021 | Schachtschneider et al. | |

FOREIGN PATENT DOCUMENTS

| | | | | |
|---|---|---|---|---|
| CN | 102660814 | | 9/2012 | |
| CN | 104593921 | | 5/2015 | |
| CN | 107287718 | | 10/2017 | |
| CN | 108360102 | A * | 8/2018 | D02G 3/04 |
| KR | 100765549 | | 10/2007 | |
| KR | 100765549 | B1 * | 10/2007 | D01F 4/00 |
| KR | 101804099 | | 12/2017 | |
| KR | 20180118386 | | 10/2018 | |
| KR | 101925851 | B1 * | 2/2019 | A47G 9/10 |
| WO | 2017155756 | | 9/2017 | |
| WO | 2019/157866 | A1 | 8/2019 | |

OTHER PUBLICATIONS

Len Goon, What are Tent Fabric Specifications and Coatings?, IntentOutdoors, Sep. 15, 2017 (https://www.intentsoutdoors.co.nz/blogs/news/what-are-tent-fabric-specifications-and-coatings). (Year: 2017).*

How to Convert Denier of PP Woven Fabric to GSM, WovenPP, Jul. 17, 2019 (https://www.wovenpp.com/how-to-convert-denier-of-pp-woven-fabric-to-gsm/). (Year: 2019).*

International Search Report—PCT/KR2021/000084 dated Apr. 19, 2021.

Uster HVI 100, Instruction manual, Uster Technologies, 2008.

Communication issued Mar. 1, 2024 in European Application No. 21707889.8.

* cited by examiner

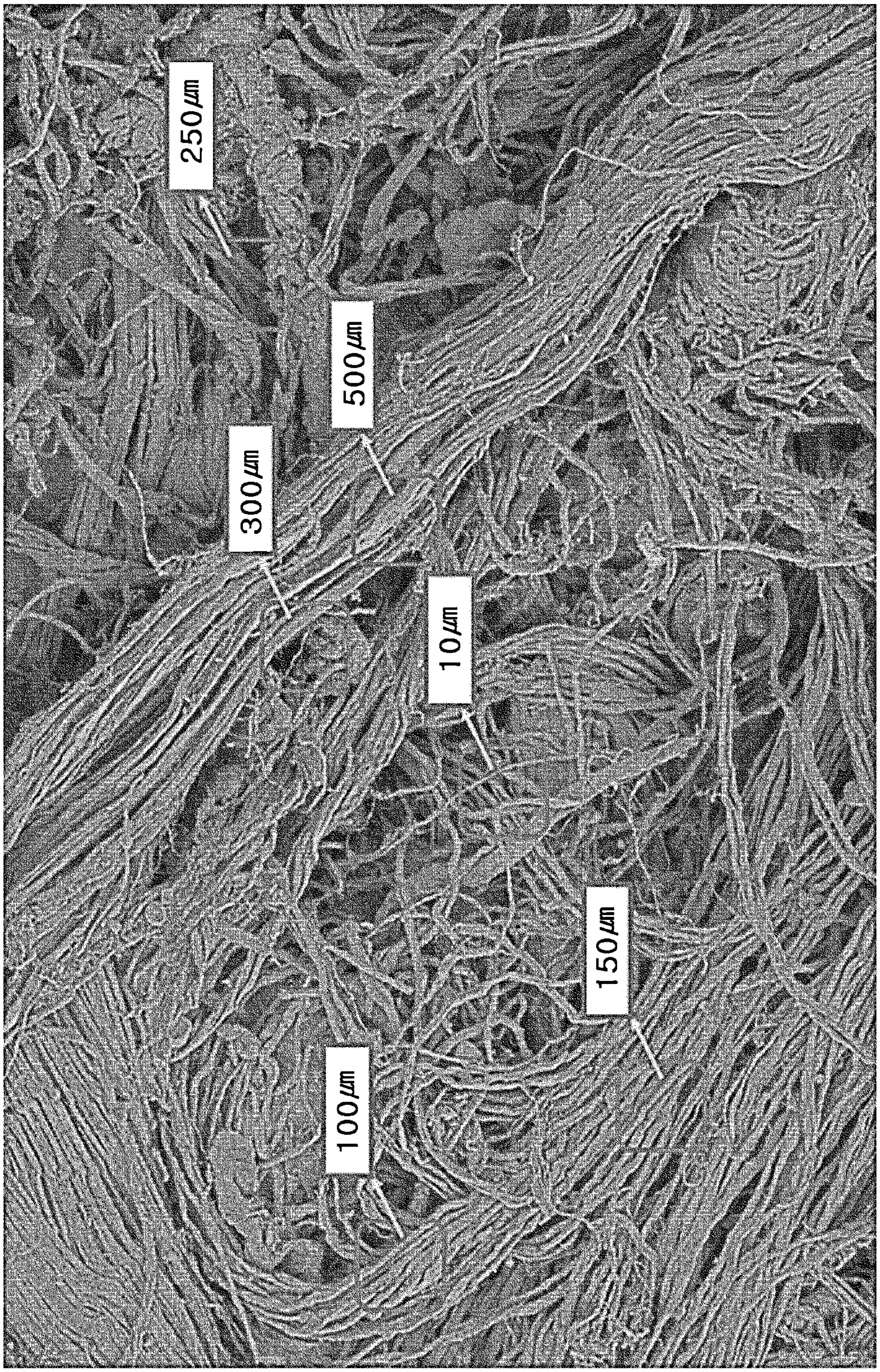
250μm
500μm
300μm
10μm
150μm
100μm

LEATHER FIBER FOR SPUN YARN

TECHNICAL FIELD

The present disclosure relates to leather fibers obtained through leather selection and leather fiber separation techniques according to the present disclosure, for manufacturing yarn with improved practical physical properties.

BACKGROUND ART

Natural leather is the tough skin that covers the body of an animal, and due to its excellent physical properties, it is widely used to make a variety of articles, including bags, shoes, and furniture. The natural leather is separated from the animal's body, and then manufactured into a product through various steps of chemical and physical processes. Among these processes, it is essential to cut the leather according to a desired product design. However, a large amount of leather waste is generated in the cutting process, and most of the leather waste is incinerated or landfilled. This causes serious environmental pollution problems. Therefore, diverse research and developments related to a method for recycling the leather waste are required.

Regarding methods for utilizing leather waste, Korean Patent Registration No. 765549 (hereinafter referred to as "Related Art 1"), entitled "METHOD FOR PRODUCING NATURAL PROTEIN FIBER," discloses a method for producing yarn using shaving scrap generated in a leather tanning process, and Korean Patent Publication No. 2018-0118386 (hereinafter referred to as "Related Art 2")), entitled "METHOD FOR MANUFACTURING LEATHER FOR HAVING GOOD HYDROLYSIS RESISTANT USING REGENERATED COLLAGEN MATERIAL," discloses a method for manufacturing a web-shaped recycled leather sheet using shaving scrap.

The related arts 1 and 2 only disclose the use of shaving scrap generated in the tanning process, but do not disclose a method for utilizing leather scraps discharged in the leather cutting process. In other words, the related arts 1 and 2 relate to technology for utilizing process by-products generated in the initial process for obtaining the leather from raw hides.

The present inventors have developed, from leather waste, leather fibers capable of manufacturing leather yarn. The present inventors have found that it is possible to manufacture materials, such as fabrics, knitted fabrics, and laces having the characteristics of natural leather, using the leather fibers developed by the present inventors. The materials manufactured with the leather fibers developed by the present inventors may replace the leather materials in existing bags and sneakers. The present inventors have also found that the leather fibers of the present disclosure may be produced without being affected by the season, and using the leather fibers of the present disclosure, a high-quality leather yarn having the properties of natural leather, such as heat retention and general flame retardancy, may be manufactured.

RELATED ART DOCUMENTS

Related Art 1: Korean Patent Registration No. 765549 (registered on Oct. 4, 2007)

Related Art 2: Korean Patent Publication No. 2018-0118386 (published on Oct. 31, 2018)

DISCLOSURE OF INVENTION

Technical Problem

The present disclosure is directed to addressing the above-described shortcomings associated with the utilization of leather scraps generated in the cutting process.

The present disclosure is further directed to providing leather fibers obtained through leather selection and separation techniques according to the present disclosure, for manufacturing leather yarn that may be used practically.

The present disclosure is still further directed to providing leather yarn excellent in shape stability and uniformity by controlling the fiber thickness and length of the leather fibers in a separating process.

Solution to Problem

Aspects of the present disclosure are not limited to the above-mentioned aspects, and other technical aspects not mentioned above will be clearly understood by those skilled in the art from the following description.

The present disclosure provides leather fibers for yarn, characterized in that the leather fibers contained in the yarn are leather fibers obtained from cowhide.

In addition, the leather fibers for the yarn are characterized in that 10% by weight or more of the leather fibers contained in the yarn are leather fibers obtained from full-grain leather.

In addition, the leather fibers for the yarn are characterized in that 30% by weight or more of the leather fibers contained in the yarn are leather fibers obtained from the full-grain leather.

In addition, the leather fibers for the yarn are characterized in that 10% by weight or more of the leather fibers contained in the yarn are leather fibers obtained from top-grain leather.

In addition, the leather fibers for the yarn are characterized in that a thickness index (M) of the leather fibers satisfies Equation 1.

$$M = D1/D2 \leq 60 \quad \text{[Equation 1]}$$

D1: average thickness of the 10 fibers having the highest thickness in 1 mg of leather fibers.

D2: average thickness of the 10 fibers having the lowest thickness in 1 mg of leather fibers.

In addition, the leather fibers for the yarn are characterized in that the amount of leather fibers having a thickness of 100 to 200 μm is 30% by weight or more of the total leather fibers contained in the yarn.

In addition, the leather fibers for the yarn are characterized in that the amount of leather fibers having an H value of 30 or more defined by the following Equation 2 is 30% by weight or more of the total leather fibers contained in the yarn.

$$H = L/D \quad \text{[Equation 2]}$$

L: leather fiber length

D: leather fiber thickness

In addition, the leather fibers for the yarn are characterized in that the amount of leather fibers having an H value of 40 or more is 15% by weight or more of the total leather fibers contained in the yarn.

In addition, the present disclosure provides a leather article, characterized in that the leather article contains the leather fibers described above.

In addition, the leather article is characterized in that the uniformity (U %, Uster method) of the leather article is 20% or less.

Advantageous Effects of Invention

The leather yarn made of the leather fibers obtained through the leather selection and separation techniques according to the present disclosure may have improved practical physical properties.

In addition, since the thickness and length of the leather fibers are controlled in the separating process, the yarn may have excellent shape stability and uniformity.

In addition, according to an embodiment of the present disclosure, since the leather fibers are generated using leather scraps discharged in a cutting process, environmental pollution can be prevented.

BRIEF DESCRIPTION OF DRAWINGS

FIG. 1 is a photograph showing the thickness of leather fibers according to an embodiment of the present disclosure.

DESCRIPTION OF EMBODIMENTS

Hereinafter, the preferred embodiments of the present disclosure will be described in more detail with reference to the accompanying drawing. Throughout the accompanying drawing, the same reference numerals are used to designate the same or similar components. In the interest of clarity, not all details of the relevant art are described in detail in the present specification if so deemed that such details are not necessary to obtain a complete understanding of the present disclosure.

Throughout this specification, terms of approximation such as “about”, “substantially”, and the like, are used to mean “at, or close to” given numerical values when manufacturing and material tolerances inherent in the stated meanings are given, and are used to prevent unscrupulous infringers from unfairly using the content referring to the exact or absolute numerical values mentioned to aid in the understanding of the present invention.

The present disclosure relates to leather fibers blended with textile fibers, such as synthetic fibers, for manufacturing leather yarn. The leather fibers may be obtained through leather selection and separation techniques according to the present disclosure, so as to improve the physical properties of the leather yarn.

The textile fibers may include: natural fibers such as cellulose-based natural fibers, protein-based natural fibers, and mineral-based fibers; semi-synthetic fibers and regenerated fibers such as cellulose-based artificial fibers, protein-based artificial fibers, and acetate-based fibers; and synthetic fibers such as polyamide-based fibers, polyester-based fibers, polyurethane-based fibers, polyurea-based fibers, polyacrylic-based fibers, polyvinyl alcohol-based fibers, polyvinyl chloride-based fibers, polyvinylidene chloride-based fibers, polypropylene-based fibers, polyethylene-based fibers, polystyrene-based fibers, and polyfluoroethylene-based fibers.

The textile fibers may be appropriately selected and used according to the purpose and the purpose of use of the leather yarn of the present disclosure.

In the case of manufacturing the leather yarn, when the amount of the leather fiber is less than 10% by weight of the leather yarn, the unique texture of leather and the like may be deteriorated. Therefore, it is preferable that the amount of the leather fiber is 10% by weight or more of the leather yarn. It would be more preferable that the amount of the leather fibers is 20% by weight or more of the yarn. However it would be preferable that, for good physical properties, the amount of the leather fibers is 80% by weight or less of the yarn.

The leather fibers used in the present disclosure are obtained from leather scraps in flake/plate form. The leather has a certain length, and thus may be processed into the leather fibers.

The leather fibers may be obtained by finely grinding the leather using the leather waste treatment apparatus disclosed in Korean Patent Registration No. 1804099, and then separating the leather fibers from the finely ground leather in the separating process of the present disclosure.

In the separating process, leather fibers having a uniform length and thickness may be separated, thereby improving the physical properties of the leather yarn as well as the uniformity of leather articles made of the leather yarn.

The finely ground leather produced by the leather waste treatment device is in a state in which powdered leather and leather fibers having irregular thicknesses ranging from several μm to several hundred μm are mixed. The finely ground leather may be separated into the leather fibers having the uniform length and thickness in the separating process of the present disclosure.

In the separating process, air pressure is applied to the leather fibers, and the leather fibers may be separated depending on the moving distance of the leather fibers due to the air pressure.

In the separating process, the leather fibers may be separated after being moved vertically or horizontally with respect to the ground by the air pressure. However, it would be preferable to perform the separation process in such a way that the leather fibers are floated vertically, and then the leather fibers that float to a predetermined height are obtained.

The air pressure in the separating process would be preferably 2 to 10 bar, and more preferably 4 to 8 bar.

As the separating process is repeated, leather fibers having the uniform thickness and length may be obtained. However, for process efficiency, it is preferable to repeat the separating process two to eight times, and more preferably three to five times.

As an example, the separating process may be performed in such a way that the leather fibers are floated in a tube formed perpendicular to the ground and having an air pressure of 2 to 8 bar applied therein, and then the leather fibers that float to a height of 1 to 4 m are obtained. Alternatively, the separating process may be performed in such a way that the leather fibers are moved in a tube formed horizontally on the ground and having an air pressure of 2 to 8 bar applied therein, and then the leather fibers that moved to a distance of 2 to 6 m are obtained.

In the present disclosure, various leathers such as cowhide, sheepskin, and pigskin may be used. However, because sheepskin or pigskin is thinner and has lower strength than cowhide, the leather fibers obtained from sheepskin or pigskin may be formed too short to produce the leather yarn.

Therefore, according to the present disclosure, it would be desirable to obtain leather fibers from cowhide.

The cowhide used in the present disclosure may be leather scraps that are discarded while cutting the leather according to the design of the product.

Unprocessed leather is divided into grain, which is the surface with a dense structure, and split, which corresponds to the dermis and forms a reticular layer. Between the grain and the split, there is a junction layer.

According to the above classification, full-grain leather is formed of the grain, top-grain leather is formed of a portion of the grain and the junction layer, and split leather is formed of a split layer.

Leather fibers obtained from the leathers classified as described above have different physical properties.

Since the full-grain leather is formed of high-density grain, the leather fibers obtained from the full-grain leather have a dense fiber arrangement and excellent physical properties such as durability and strength. The leather fibers obtained from the full-grain leather are strongly bonded to each other, thereby having a rough texture. Leather fibers obtained from the split leather formed of the reticulated layer are inferior to the leather fibers obtained from the full-grain leather in terms of physical properties such as strength. However, since the leather fibers obtained from the split leather have a weak bond between the fibers compared to the leather fibers obtained from the full-grain leather, the leather fibers obtained from the split leather has a better texture than the leather fibers obtained from the full-grain leather.

Leather fibers produced from the top grain leather are formed of a portion of the grain and the junction layer, thereby having properties between those of the full grain leather and the split leather.

The leather yarn according to the present disclosure has improved physical properties by controlling the content of leather fibers obtained from the full-grain leather having a dense fiber arrangement and high density. It would be preferable that the amount of the leather fibers obtained from the full-grain leather is 10% by weight or more of the total leather fibers contained in the leather yarn according to the present disclosure.

In order to improve physical properties such as strength, it would be preferable that the amount of the leather fibers obtained from the full-grain leather is 10% by weight or more of the total leather fibers contained in the leather yarn, and more preferably 30% by weight or more.

As the content of the leather fibers obtained from the full-grain leather increases, the physical properties of the leather yarn are improved, but the texture may deteriorate. Therefore, it would be preferable that the amount of the leather fibers obtained from the full-grain leather is 70% by weight or less of the total leather fibers contained in the leather yarn.

In order to improve the physical properties and texture of the leather yarn containing the leather fibers of the present disclosure, it would be preferable that the amount of the leather fibers obtained from the top-grain leather is 10% by weight or more of the total leather fibers contained in the leather yarn according to the present disclosure.

The leather fibers obtained from the top-grain leather have excellent physical properties, and the texture thereof is superior to the leather fibers obtained from the full-grain leather. When the leather fibers obtained from the top-grain leather are contained in the leather yarn, the texture of the leather yarn may be improved.

It would be preferable that the leather fibers obtained in the separating process of the present disclosure satisfy the following Equation 1.

$$M = D1/D2 \leq 60 \qquad \text{[Equation 1]}$$

D1: average thickness of the 10 fibers having the highest thickness in 1 mg of leather fibers.

D2: average thickness of the 10 fibers having the lowest thickness in 1 mg of leather fibers.

When the M value of Equation 1 exceeds 60, the manufacturing processability and the uniformity of leather yarn may decrease.

It was confirmed that the higher the ratio of leather fibers of 100 to 200 μm thickness to the total leather fibers, the better the shape stability and workability of the leather yarn. When a fiber having a thickness of 100 to 200 μm is defined as a main fiber (MF), it would be preferable that the amount of the MF of the leather fibers is 30% by weight or more of the total leather fibers.

The physical properties and shape stability of the leather yarn of the present disclosure depend on the thickness and length of the leather fibers constituting the leather yarn. As expressed in Equation 2 below, when the ratio of the leather fiber length (L) to the leather fiber thickness (D) is defined as H (index), it would be preferable that the amount of the leather fibers having an H value of 30 or more is 30% by weight or more of the total leather fibers. It would be more preferable that the amount of the leather fibers having an H value of 40 or more is 15% by weight or more of the total leather fibers.

$$H = L/D \qquad \text{[Equation 2]}$$

L: leather fiber length

D: leather fiber thickness

The increase in the H value means that the length of the leather fiber becomes longer and the thickness of the leather fiber becomes thinner. The higher the content of leather fibers having a high H value, the better the physical properties and shape stability of the leather yarn.

Leather fibers having the above conditions are blended with textile fibers to produce the leather yarn. The leather fibers of the present disclosure may be manufactured into the leather yarn using a carding machine, a drawing frame, a flyer frame, and a spinning machine, or conventional yarn manufacturing processes.

Hereinafter, examples of the present disclosure for manufacturing the leather yarn containing leather fibers are disclosed. The present disclosure is not limited to these examples.

Measurement Method

The strength of the leather yarn was measured using a universal testing machine (UTM) of Instron under a temperature of 20° C. and a humidity of 65% in accordance with the ASTM D2256 standard.

The texture was evaluated by averaging scores out of 10 given by 10 textile experts in a sensory evaluation.

Average of thickest/least thick fibers (D1, D2): a value obtained by averaging the thicknesses of 10 fibers in decreasing/increasing order of thickness using an optical microscope as shown in FIG. 1.

Manufacturing processability of yarn (the number of broken fibers): the number of broken fibers per 100,000 m of the yarn when manufacturing the yarn.

Uniformity of yarn (U %): a value measured by the Uster method

Embodiment 1: Physical Properties of Leather Fibers Depending on the Type of Leather Cowhide, sheepskin, and pigskin were each finely ground using a leather waste treatment apparatus, and then, respective leather fibers were obtained in a separating process.

The separating process was performed in such a way that the leather fibers were floated by air pressure in a tube formed perpendicular to the ground, and then the leather fibers that floated to a height of 2 m were obtained.

The separating process was performed twice under an air pressure of 6 bar to produce the leather fibers.

The thickness index (M), H value, and MF (main fiber: fibers having a thickness of 100 to 200 μm) of the leather fibers obtained from the cowhide, sheepskin, and pigskin were measured, and are shown in Table 1 below.

TABLE 1

| Category | Unit | Cowhide | Sheepskin | Pigskin |
|---|---|---|---|---|
| Thickness index (M) | — | 57 | 45 | 52 |
| H ≥ 30 ratio | % by weight | 31 | 14 | 5 |
| MF | % by weight | 30 | 31 | 28 |

As shown in Table 1, all of the leather fibers obtained from the cowhide, the sheepskin and the pigskin had a thickness index of 60 or less, and the difference in MF content was not large among the cowhide, the sheepskin, and the pigskin. However, since the amounts of the leather fibers obtained from the sheepskin and the pigskin that satisfy the H≥30 ratio are 14% by weight and 5% by weight of the total leather fibers, respectively, the length of the leather fibers obtained from the sheepskin and the pigskin are formed very short, and thus the manufacturing processability would be greatly degraded when manufacturing the leather yarn using the leather fibers obtained from the sheepskin and the pigskin. On the other hand, as shown in Table 1, in the case of the leather fibers obtained from the cowhide, since the amount of the leather fibers satisfying the H≥30 ratio is 31% by weight of the total leather fiber, it can be seen that the leather fibers obtained from the cowhide are suitable for the leather yarn.

Embodiment 2: Physical Properties (1) Depending on the Leather Fibers Used

The cowhide was finely ground using the leather waste treatment apparatus, and then the leather fibers were obtained in a separating process.

The obtained leather fibers and polyester short fibers having a fineness of 1.5 denier and a fiber length of 38 mm were blended at a weight ratio of 50:50 to manufacture leather yarn of 500 denier.

The separating process was performed in such a way that the leather fibers were floated by air pressure of 6 bar in a tube formed perpendicular to the ground, and then the leather fibers that floated to a height of 2 m were obtained. The leather yarn was manufactured using the leather fibers obtained by repeating the separating process three times.

The leather fibers were obtained from the full-grain leather and split leather of the cowhide. Table 2 shows the strength and texture of the leather yarn depending on the amount of the leather fibers obtained from the full-grain leather contained in the total leather fibers.

TABLE 2

| Full-grain leather content (% by weight) | Strength (g/d) | Texture |
|---|---|---|
| 0 | 0.71 | 10 |
| 10 | 0.82 | 9.8 |
| 20 | 0.85 | 9.5 |
| 30 | 1.07 | 9.5 |
| 40 | 1.18 | 9.3 |
| 50 | 1.25 | 9.3 |
| 60 | 1.35 | 9.1 |
| 70 | 1.45 | 8.9 |
| 80 | 1.48 | 8.5 |
| 90 | 1.49 | 8.1 |
| 100 | 1.52 | 7.7 |

As can be seen from Table 2, as the content of the leather fibers obtained from the full-grain leather contained in the total leather fibers increases, the strength of the leather yarn increases, but the texture of the leather yarn is deteriorated. When the amount of the leather fibers obtained from the full-grain leather is 10% by weight of the total leather fibers, the strength of the leather yarn is 0.8 g/d or more, which indicates that the leather yarn can be practically used. When the amount of leather fibers obtained from the full-grain leather is 30% by weight of the total leather fibers, the strength of the leather yarn is greatly increased. Therefore, it is more preferable that the amount of the leather fibers obtained from the full-grain leather is 30% by weight or more of the total leather fibers. However, considering the texture, it would be preferable that the amount of the leather fibers obtained from the full-grain leather is 70% by weight or less of the total leather fibers.

Embodiment 3: Physical Properties (2) Depending on the Leather Fibers Used

The leather yarn of example 3 was manufactured in the same manner as in example 2, but the leather fibers were obtained from the full-grain leather, the top-grain leather, and the split leather.

Table 3 shows the strength and texture of the leather yarn depending on the content of leather fibers obtained from the full-grain leather and the top-grain leather.

TABLE 3

| Full-grain leather content (% by weight) | Top-grain leather content (% by weight) | Strength | Texture |
|---|---|---|---|
| 10 | 10 | 0.83 | 9.8 |
| 10 | 20 | 0.83 | 9.7 |
| 10 | 30 | 0.85 | 9.8 |
| 20 | 10 | 0.87 | 9.7 |
| 20 | 20 | 0.88 | 9.5 |
| 20 | 30 | 0.91 | 9.5 |
| 30 | 10 | 1.11 | 9.6 |
| 30 | 20 | 1.12 | 9.5 |
| 30 | 30 | 1.15 | 9.6 |
| 40 | 10 | 1.21 | 9.5 |
| 40 | 20 | 1.25 | 9.4 |
| 40 | 30 | 1.28 | 9.6 |

As can be seen from Table 3, when the content of the leather fibers obtained from the full-grain leather was constant, the strength of the leather yarn increased as the content of the leather fibers obtained from the top-grain leather increased, but there was no significant difference in the texture of the leather yarn. Therefore, both the leather fibers obtained from the full-grain leather and the leather fibers obtained from the top-grain leather may be used to improve the strength and the texture of the leather yarn.

It would be preferable that the amount of the leather fibers obtained from the top-grain leather is 10% by weight or more of the total leather fibers.

Embodiment 4: Manufacturing Processability and Uniformity of Leather Yarn Depending on the Separating Processes Example 1

The cowhide was finely ground using the leather waste treatment apparatus, and then the leather fibers were obtained in a separating process.

The obtained leather fibers and polyester short fibers having a fineness of 1.5 denier and a fiber length of 38 mm were blended at a weight ratio of 50:50 to manufacture a leather yarn of 500 denier.

The separating process was performed in such a way that the leather fibers were floated by air pressure in a tube formed perpendicular to the ground, and then the leather fibers that floated to a height of 2 m were obtained.

The separating process was performed twice under an air pressure of 6 bar to produce the leather fibers.

Example 2

The leather yarn was manufactured in the same manner as in example 1, but leather fibers obtained by performing the separating process three times were used.

Example 3

The leather yarn was manufactured in the same manner as in example 1, but leather fibers obtained by performing the separating process four times were used.

Example 4

The leather yarn was manufactured in the same manner as in example 1, but leather fibers obtained by performing the separate process five times were used.

Comparative Example 1

The leather yarn was manufactured in the same manner as in example 1, but leather fibers obtained by performing the separating process once under air pressure of 4 bar were used.

Comparative Example 2

The leather yarn was manufactured in the same manner as in example 1, but leather fibers obtained by performing the separating process once under air pressure of 3 bar were used.

Comparative Example 3

The leather yarn was manufactured in the same manner as in example 1, but leather fibers obtained by performing the separating process once under air pressure of 2 bar were used.

Comparative Example 4

The leather yarn was manufactured in the same manner as in example 1, but leather fibers obtained by performing the separating process twice under air pressure of 4 bar were used.

Comparative Example 5

The leather yarn was manufactured in the same manner as in example 1, but leather fibers obtained by performing the separating process twice under air pressure of 3 bar were used.

The thickness index (M), H value, MF and manufacturing processability for leather yarn (the number of broken fibers), uniformity of yarn (U %) of the leather fibers obtained in examples 1 to 4 and Comparative Examples 1 to 5 are shown in Tables 4 and 5, respectively.

TABLE 4

| Category | Unit | Example 1 | Example 2 | Example 3 | Example 4 |
|---|---|---|---|---|---|
| Thickness index (M) | — | 57 | 45 | 32 | 25 |
| H ≥ 30 ratio | % by weight | 31 | 32 | 43 | 50 |
| H ≥ 40 ratio | % by weight | 15 | 18 | 24 | 35 |
| MF | % by weight | 30 | 36 | 41 | 50 |
| manufacturing processability (number of broken fibers) | number | 3.2 | 2 | 1.8 | 1.5 |
| Uniformity of yarn (U %) | % | 19.7 | 16.7 | 14.5 | 13.9 |

TABLE 5

| Category | Unit | Comparative example 1 | Comparative example 2 | Comparative example 3 | Comparative example 4 | Comparative example 5 |
|---|---|---|---|---|---|---|
| Thickness index (M) | — | 63 | 70 | 88 | 56 | 54 |
| H ≥ 30 ratio | % by weight | 28 | 22 | 16 | 32 | 32 |
| H ≥ 40 ratio | % by weight | 13 | 11 | 6 | 17 | 16 |
| MF | % by weight | 28 | 27 | 22 | 21 | 19 |

TABLE 5-continued

| Category | Unit | Comparative example 1 | Comparative example 2 | Comparative example 3 | Comparative example 4 | Comparative example 5 |
|---|---|---|---|---|---|---|
| manufacturing processability (number of fiber breaks) | number | 12.6 | 15.8 | Not manufactured | 8.8 | 9.2 |
| Uniformity of yarn (U %) | % | 29.3 | 36.7 | | 22.1 | 24 |

As can be seen in Table 4, the leather fibers obtained in all of examples 1 to 4 have a thickness index (M) of 60 or less, but as the number of repetitions of the separating process increases, the content of leather fibers having a small thickness index (M) and a large H value increases. In addition, as can be seen in Table 5, when the air pressure in the separation process is low as in comparative examples 1 to 5, the separation process was insufficiently performed, and thus all conditions including the thickness index were not satisfied.

It can be seen that the leather yarn according to examples 1 to 4 has excellent manufacturing processability of less than 5 broken fibers compared to the leather yarn according to comparative examples 1 to 5. In addition, it can be seen that the uniformity of leather yarn according to the examples 1 to 4 is less than 20%.

As can be seen from examples 1 to 4, when the separation process for separating leather fibers is performed three or more times under air pressure of 4 bar, the uniformity of leather yarn may be increased, thereby improving the physical properties of the leather yarn.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

It will of course be realized that while the foregoing has been given by way of illustrative example of this disclosure, all such and other modifications and variations thereto as would be apparent to those skilled in the art are deemed to fall within the broad scope and ambit of this disclosure as is herein set forth.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

The invention claimed is:

1. A bundle of leather fibers obtained from cowhide and satisfying:

$M=D1/D2\leq 60$ where D1: average thickness of the 10 fibers having the highest thickness in 1 mg of leather fibers, and D2: average thickness of the 10 fibers having the lowest thickness in 1 mg of leather fibers, wherein 30 wt % or more of the leather fibers have a thickness of 100 to 200 μm, and 30 wt % or more of the leather fibers have an H value of 30 or more, and wherein the H value is defined as follows:

H=leather fiber length/leather fiber thickness.

* * * * *